United States Patent Office 3,178,475
Patented Apr. 13, 1965

3,178,475
BENZOYL GUANIDINES
Paul Schmidt, Therwil, and Kurt Eichenberger and Max Wilhelm, Basel, Switzerland, assignors to Ciba Corporation, New York, N.Y., a corporation of Delaware
No Drawing. Filed Aug. 22, 1962, Ser. No. 218,539
Claims priority, application Switzerland, Sept. 5, 1961, 10,297/61; June 29, 1962, 7,861/62
15 Claims. (Cl. 260—558)

This invention relates to new guanidines. More especially it concerns 2-aminobenzoyl guanidines and their salts. The amino group may be free or substituted, for instance by hydrocarbon radicals, for example alkyl radicals, such as lower alkyl radicals, for example methyl, ethyl, propyl or butyl radicals, but more particularly by an acyl radical, primarily of aliphatic or aromatic carboxylic acids, for example a lower alkanoyl radical, such as an acetyl or propionyl radical or a benzoyl or carbamyl radical.

The guanidino groups may also have substituents, preferably alkyl radicals for example lower alkyl radicals such as those mentioned above; an amino group of the guanidino group may be part of a heterocyclic ring, such as, for instance, of piperidine, morpholine or pyrrolidine.

Furthermore, the benzene nucleus may also be further substituted, for example by lower alkyl radicals, e.g. those mentioned above, lower alkoxy radicals, for example methoxy, ethoxy, propoxy or butoxy radicals, or nitro or amino groups, e.g. free or acylated amino groups or halogen atoms, such as chlorine, bromine or the pseudohalogen trifluoromethyl.

The invention relates in particular to 2-acetylaminobenzoyl guanidine of the formula

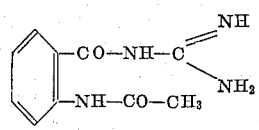

and 2-aminobenzoyl guandine and their salts.

The new compounds, in particular those indicated above as particularly preferred, have an anti-inflammatory, antipyretic, and anti-allergic action and, accordingly, can be employed as medicaments, for example in the treatment of inflammatory or allergic processes. They are also valuable intermediate products for the preparation of other compounds which can be employed more particularly as pharmaceutics.

The new compounds are obtained by methods known per se. Thus, benzoic acids or their functional derivatives which have in 2-position a free or substituted amino group or a substituent which can be converted into such a group can be reacted with guanidines and in resulting compounds which contain in the 2-position a substituent convertible into a free or substituted amino group, this substituent is so converted. The guanidines are advantageously employed in the form of their salts. As functional derivatives of the said benzoic acids it is possible to react their halides, anhydrides or esters and, in particular, lactones of 2-acylamino benzoic acids, i.e. 4-oxobenzo-3:1-oxazines, are employed.

The reaction with the guanidines is preferably carried out in the presence of a diluent, such as an alcohol or tetrahydrofuran, but more particularly pyridine. Starting from the benzoic acid halides, it is possible to operate in an aqueous medium in the presence of a condensing agent.

A substituent which can be transformed into a free or substituted amino group is converted into such a group by methods known per se. Such a substituent is, for instance, the nitro group or a halogen atom, in particular chlorine.

The nitro group can be transformed in conventional manner by reduction into the amino group and a halogen atom can be replaced by an amino group by reaction with ammonia or an amine.

In the compounds obtained, it is possible to split off the acyl radical of an acylamino group in 2-position. Likewise, a nitro group in the benzene nucleus can be reduced to the amino group.

The invention also relates to those embodiments of the process in which a start is made from a compound which can be obtained as an intermediate product at any stage and the missing steps are carried out, or the process is interrupted at any stage, or in which a starting material is formed under the reaction conditions or employed in the form of a salt.

Depending on the reaction conditions and starting materials, the new compounds are obtained in free form or in the form of their salts. The salts of the new compounds can be converted in manner known per se into the free compounds, for example acid addition salts by reaction with a basic agent. On the other hand, if required, free bases obtained may form salts with inorganic or organic acids. More particularly, to produce acid addition salts, therapeutically acceptable acids are employed, for example: hydrohalic acids, for instance hydrochloric acid or hydrobromic acid, perchloric acid, nitric acid or thiocyanic acid, sulfuric or phosphoric acids, or organic acids, such as formic acid, acetic acid, propionic acid, glycolic acid, lactic acid, pyroracemic acid, oxalic acid, malonic acid, succinic acid, malei acid, fumaric acid, malic acid, tartaric acid, citric acid, ascorbic acid, hydroxymaleic acid, dihydroxymaleic acid, benzoic acid, phenylacetic acid, 4-aminobenzoic acid, 4-hydroxybenzoic acid, anthranilic acid, cinnamic acid, mandelic acid, salicylic acid, 4-aminosalicyclic acid, 2-phenoxybenzoic acid, 2-acetoxybenzoic acid, methanesulfonic acid, ethanesulfonic acid, hydroxyethanesulfonic acid, benzenesulfonic acid, p-toluenesulfonic acid, naphthalenesulfonic acid or sulfanilic acid, or methionine, tryptophan, lysine or arginine. The salts may be mono or poly salts.

The new compounds are intended to be employed in the form of pharmaceutical preparations containing these compounds in admixture or conjunction with solid or liquid pharmaceutical organic or inorganic carriers suitable for enteral, for example oral, or parenteral administration. As carrier there are used substances which do not react with the new compounds, such as for example, water, gelatine, lactose, starch, magnesium stearate, talc, vegetable oils, benzyl alcohols, gums, polyalkylene glycols, petroleum jelly, cholesterol or other known carriers for medicaments. The pharmaceutical preparations may be in the form, for example, of tablets, dragees or capsules or in liquid form as solutions, suspensions or emulsions. If desired, they are sterilized and/or contain auxiliary substances, such as preserving, stabilizing, wetting or emulsifying agents, salts for altering the osmotic pressure or buffers. They may also contain other therapeutically valuable substances. The new compounds may also be employed in veterinary medicine, for instance in one of the above-mentioned forms.

The invention is described in more detail in the following examples.

*Example 1*

A solution of 14.9 grams of 2-methyl-4-oxo-benzo-3:1-oxazine and 14 grams of guanidine carbonate in 200 cc. of pyridine is boiled for 10 hours under reflux. The solution is then filtered with suction from the small amount of undissolved material and evaporated to dryness in vacuo and the glassy residue is ground with hot isopropyl ether, solidifying in crystalline form. By recrystallization from hot water, 2-acetyl-aminobenzoyl guanidine of the formula

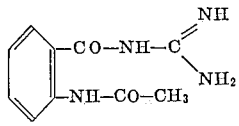

is obtained in white crystals having a melting point of 185–187° C.

With alcoholic hydrochloric acid the hydrochloride is formed, this melting at 197–199° C. with decomposition.

*Example 2*

70 cc. of 4-n alcoholic hydrochloric acid are added to 4.4 grams of acetylaminobenzoyl guanidine and heating for 10 minutes under reflux, rapid cooling to 30–40° C., filtering off with suction from the crystalline precipitate deposited and thorough washing with alcohol are carried out. 2-aminobenzoyl guanidine dihydrochloride of the formula

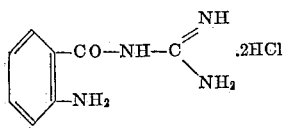

is thus obtained in white crystals having a melting point of 275° C.

*Example 3*

19.5 grams of 2-methyl-4-oxo-6-chorobenzo-3:1-oxazine and 13.3 grams of guanidine carbonate are boiled in 400 cc. of pyridine for 10 hours under reflux. The solution is then filtered with suction from the small amount of undissolved material and evaporated to dryness in vacuo and the glassy residue is ground with water, solidifying in crystalline form. The crystals are filtered off with suction and washed with water. 20 grams of these crystals are dissolved in 140 cc. of 2-n hydrochloric acid. After a short time, crystals begin to precipitate. The solution is heated for about 5 minutes on a water bath, then allowed to cool, and the crystals are filtered off with suction. In this way, the hydrochloride of 2-acetylamino-5-chlorobenzoyl guanidine of the formula

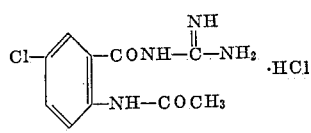

is obtained.

This melts at 220–221° C. If the temperature is increased slightly further, the molten mass solidifies again.

*Example 4*

A solution of 10.3 grams of 2-methyl-4-oxo-7-nitrobenzo-3:1-oxazine and 6.7 grams of guanidine carbonate in 200 cc. of pyridine is boiled for 10 hours under reflux. After cooling, the precipitated crystals are filtered off with suction and well washed with water. In this way, 2-acetyl-amino-4-nitrobenzoyl guanidine of the formula

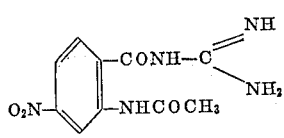

and having a melting point of 252–254° C. is obtained.

After 2-n hydrochloric acid has been added to the 2-acetylamino-4-nitrobenzoyl guanidine, the hydrochloride, which has a melting point of 237–238° C. (decomposition), is precipitated after a short time.

The 2-methyl-4-oxo-7-nitrobenzo-3:1-oxazine used as starting material is prepared as follows:

9.1 grams of 4-nitroanthranilic acid and 50 cc. of acetic anhydride are heated for 3 hours to 100–110° C. on a water bath while stirring. Therefter, the solution is completely evaporated in vacuo. The residue is boiled up with benzene and the benzene solution is filtered and concentrated, 2-methyl-4-oxo-7-nitro-benzo-3:1-oxazine of the formula

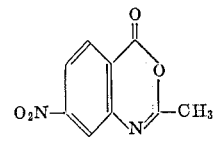

and having a melting point of 137–139° C. being crystallized out.

*Example 5*

A solution of 20.8 grams of 2-nitro-benzoyl guanidine in 300 cc. of ethyl alcohol is hydrogenated with 4 grams of Raney nickel at room temperature. The calculated quantity of hydrogen is taken up within 3 hours. The catalyst is filtered off with suction, the reaction mixture evaporated to dryness in vacuo and the residue treated with 4 N-alcoholic hydrochloric acid and the precipitated 2-amino-benzoyl guanidine-dihydrochloride filtered with suction. The product melts at 275° C. and shows no mixed melting point depression with the product obtained according to Example 2.

The 2-nitro-benzoyl guanidine used as starting material is obtained by condensing 2-nitro-benzoic acid chloride with guanidine carbonate.

*Example 6*

A solution of 20.6 grams of 2-methyl-4-oxo-6-nitrobenzo-3:1-oxazine and 10 grams of guanidine carbonate in 400 cc. of pyridine is boiled under reflux for 12 hours with stirring and then evaporated to dryness. The residue is boiled with 170 cc. of absolute alcohol and there is obtained as insoluble portion, 2-acetylamino-5-nitro-benzoyl guanidine of the formula

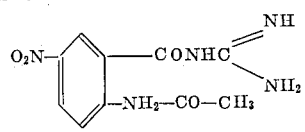

melting at 248–249° C.

*Example 7*

5.3 grams of 2-acetylamino-5-nitro-benzoyl guanidine in 20 cc. of N-hydrochloric acid and 155 cc. of water are hydrogenated with 500 mg. of palladium carbon of 10% strength. After the calculated quantity of hydrogen has been taken up, the catalyst is filtered off and the reaction mixture evaporated to dryness to yield the hydrochloride of 2-acetylamino-5-amino-benzoyl guanidine of the formula

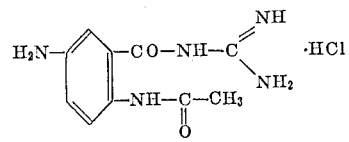

melting at 226–228° C. with decomposition.

*Example 8*

A solution of 8.7 grams of 2-methyl-4-oxo-6-acetylamino-benzo-3:1-oxazine and 4 grams of guanidine carbonate is boiled under reflux in 160 cc. of pyridine for 12 hours with stirring. After cooling, the crystals are filtered off and dissolved with heating in 90 cc. of 2 N-hydrochloric acid. After cooling, the hydrochloride of 2:5-bis-acetylamino-benzoyl-guanidine hydrate of the formula

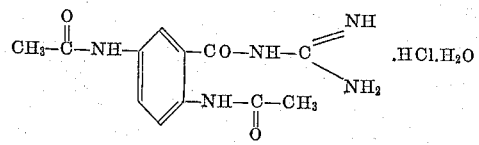

precipitates; M.P. 198–200° C.

What is claimed is:

1. A member selected from the group consisting of a benzoylguanidine of the formula

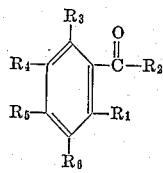

wherein $R_1$ stands for a member selected from the group consisting of lower alkyl-substituted amino, and carboxylic acid acyl amino, $R_2$ for a member selected from the group consisting of unsubstituted guanidino, guanidino N-substituted by lower alkyl and guanidino in which an amino group of the guanidino group is part of a heterocyclic ring selected from the group consisting of piperidine, morpholine and pyrrolidine ring and $R_3$, $R_4$, $R_5$ and $R_6$, each stands for a member selected from the group consisting of hydrogen, lower alkyl, lower alkoxy, nitro, amino, carboxylic acid, acylamino, halogen and trifluoromethyl, said carboxylic acid acylamino being selected from the group consisting of lower alkanoylamino, benzoylamino and carbamylamino and their therapeutically acceptable acid addition salts.

2. 2-acetylamino-benzoyl guanidine.
3. A therapeutically acceptable acid addition salt of the compound claimed in claim 2.
4. 2-acetylamino-5-chloro-benzoyl guanidine.
5. A therapeutically acceptable acid addition salt of the compound claimed in claim 4.
6. 2-acetylamino-4-nitro-benzoyl guanidine.
7. A therapeutically acceptable acid addition salt of the compound claimed in claim 6.
8. 2-acetylamino-5-nitro-benzoyl guanidine.
9. A therapeutically acceptable acid addition salt of the compound claimed in claim 8.
10. 2-acetylamino-5-amino-benzoyl guanidine.
11. A therapeutically acceptable acid addition salt of the compound claimed in claim 10.
12. 2:5-bis-acetylamino-benzoyl guanidine.
13. A therapeutically acceptable acid addition salt of the compound claimed in claim 12.
14. A compound of the formula

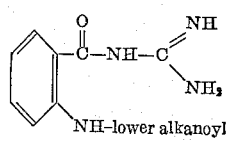

15. A therapeutically acceptable acid addition salt of a compound claimed in claim 14.

References Cited by the Examiner

FOREIGN PATENTS 164,024   9/49   Austria.

OTHER REFERENCES

Kurzer: Jour. Chem. Soc. (London), pages 4524–4531 (1956).

Perrot et al.: Compt. rend., vol. 230, pages 1084–1086 (1950).

Perrot et al.: Bull. Soc. Chim., France, page 916 (1951).

IRVING MARCUS, *Primary Examiner.*

WALTER A. MODANCE, *Examiner.*